No. 658,819. Patented Oct. 2, 1900.
T. F. WILLIAMS.
ACETYLENE GAS GENERATOR.
(Application filed May 11, 1899.)
(No Model.)
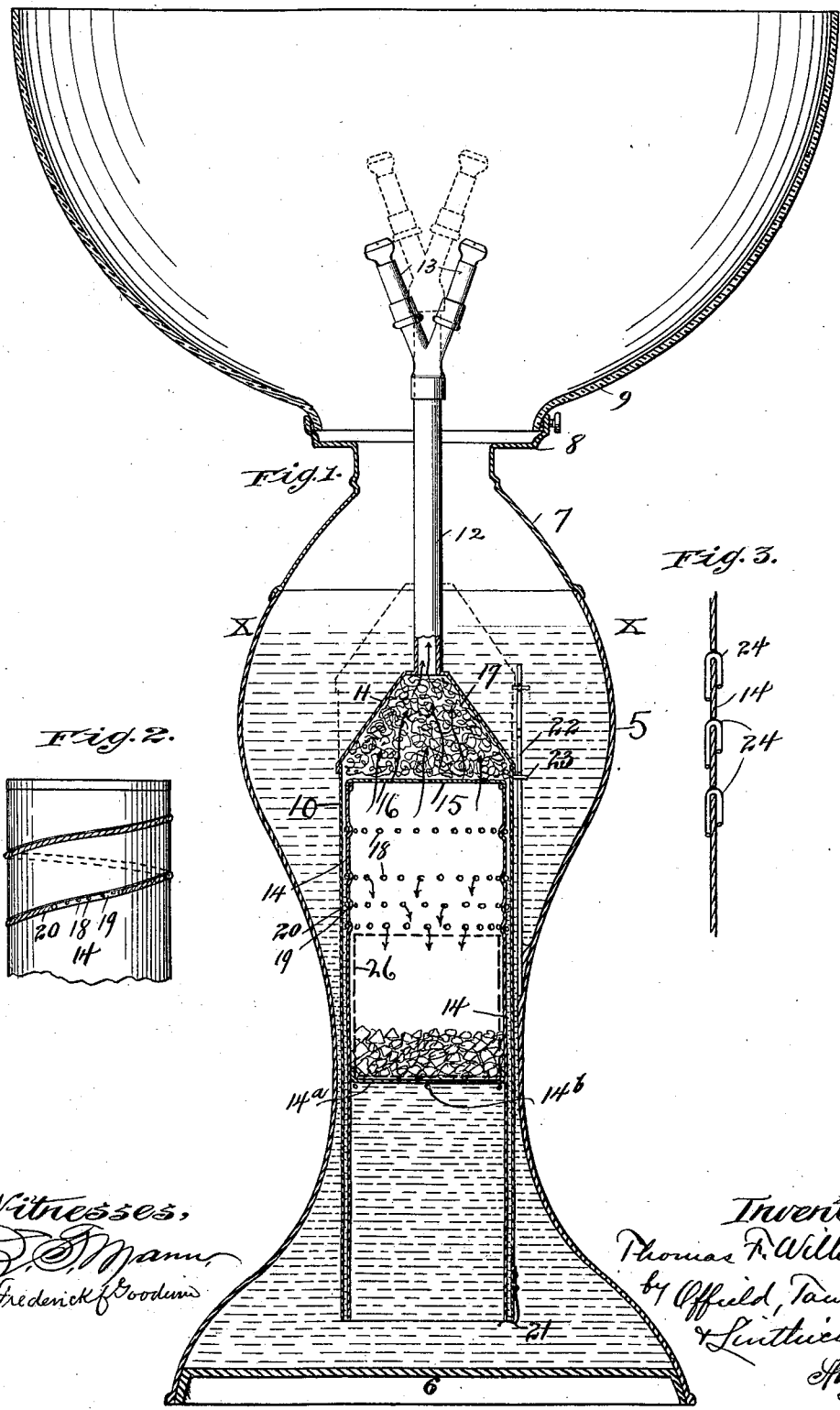

ively control the supply of water which is furnished to the carbid,
UNITED STATES PATENT OFFICE.

THOMAS F. WILLIAMS, OF CHICAGO, ILLINOIS, ASSIGNOR TO EDWARD L. WILLIAMS, OF GILLHAM, ARKANSAS.

ACETYLENE-GAS GENERATOR.

SPECIFICATION forming part of Letters Patent No. 658,819, dated October 2, 1900.

Application filed May 11, 1899. Serial No. 716,370. (No model.)

*To all whom it may concern:*

Be it known that I, THOMAS F. WILLIAMS, of Chicago, in the county of Cook and State of Illinois, have invented certain new and useful Improvements in Acetylene-Gas Generators, of which the following is a specification.

This invention relates to an improvement in acetylene-gas generators and is adapted particularly for generating a limited amount of acetylene gas, such as is adequate to supply a portable house-lamp, although some of the principles of my invention may be employed in other forms of lamp and also in generators for supplying a number of lamps.

The principal object of my invention is to make a simple and convenient form of generator and one in which the pressure of the gas is made to automatically control the supply of water which is furnished to the carbid, and thereby control the quantity of gas made proportionately to the quantity consumed or which it is desired to store.

I have shown my invention as embodied in a house-lamp.

Figure 1 is a vertical sectional elevation, the burner-tube and burners in elevation. Figs. 2 and 3 are details showing a modified construction.

In the drawings, let 5 represent a suitable ornate body having a bottom 6, which may be closed, and a cap 7, separable from the body 5. The cap is surmounted by a globe ring or gallery 8 to hold the globe 9.

10 represents a shell or vessel with an open bottom and a dome-shaped top 11, constituting a gas-chamber, from the upper portion of which extends the burner-supply pipe 12, surmounted by the burner-tips 13. Within the vessel 10 is placed the removable carbid-holder, consisting of a closed vessel 14, suitably supported within the vessel 10 and with its wall sufficiently separated therefrom to provide an annular water-space. The upper end of the generating-chamber 14 is closed by removable cap 15, having perforations 16 for the escape of the gas, and above said cap cotton or other strainer material, as shown at 17, may be placed. The bottom wall of the vessel is marked $14^a$ and is shown as located at a distance above the lower end of the side wall, which latter extends to the lower end of the vessel 10. When so located, minute perforations $14^b$ may be provided to permit the inclosed air to escape from below the bottom as the vessel is being immersed in the water. The wall of the vessel 14 is perforated to admit water in regulated quantities to the interior of the carbid-chamber. The provisions for admitting water, as shown, are a series of minute perforations 18, formed within the bottom of circumferential grooves or channels 19, formed in such wall and at graduated distances from the top thereof. These apertures may be uncovered; but I preferably place therein cotton-wicking 20, which will not only serve as a strainer for the water entering the carbid-chamber, but will also fractionate the water and deliver it in minute particles to the apertures, which are of themselves of such small size as to prevent the water entering in streams and cause it to enter in the form of minute drops or particles. These apertures are located, as shown in Fig. 1, in parallel zones at varying distances above the carbid. Four series of apertures are shown in Fig. 1, and a greater or less number may be provided, although I have found that in a lamp of the proportions shown the locations indicated are best. The carbid-chamber may have its side walls extended down flush with the bottom of the vessel 10 and a simple catch, as shown at 21, applied to sustain it in position. The outer vessel 10 is adjustably supported within the body 5 in any convenient manner, the means shown comprising a notched standard 22, adapted to receive a pin 23, carried by the vessel 10.

In Fig. 2 I have shown the vessel 14 provided with a spiral groove having perforations in its bottom and a single strand or piece of wicking wound therein.

In Fig. 3 I have shown another modification, the wall of the vessel 14 being pierced with apertures at different elevations and a simple loop of wire 24, having one leg thereof passed through the apertures and serving as a conductor for introducing the water in the finely-subdivided condition to the interior of the carbid-chamber.

In the operation of this generator water is filled into the chamber of the outer shell 5, preferably to the height indicated by the water-line X, and the liquid fills the body of the chamber and rises in volume to the bottom wall of the carbid-chamber and also in a thin annular column between the vessels 10 and 14, entering the carbid-chamber through more or less of the apertures, depending on the height of such annular column. When the generator is charged, it may be raised to its highest point, as indicated by the dotted lines, showing a partial outline of the tube and burners and the upper part of the vessels 10 and 14. In such position the water-column between the vessels will reach only the lowermost of the apertures. As the generation of gas proceeds and begins to be consumed the generation will proceed somewhat evenly and regularly, becoming, however, more rapid as the residue or ash of the carbid forms a saturated body, affording an excess of moisture over that originally admitted through the perforations and producing an excess quantity of gas over that consumed at the burners. Such excess supply of gas will exert a pressure upon the upper surface of the annular water-column between the vessels 10 and 14, tending to drive the water down, and thus preventing its flow to so great an extent into the carbid-chamber. If for any reason the apertures should become clogged or a greater quantity of gas consumed, the pressure will be released, the column of water will rise, and a greater quantity of water will be discharged in the carbid vessel. Thus the supply of water is automatically regulated in proportion to the amount of gas required or produced. If by the consumption of the water or if the requirements for gas be increased, a greater quantity may be produced by lowering the generator bodily, thus increasing the height of the annular column and immersing a larger number of the water-feed openings. The generator is not only automatic in predetermined positions, but is of variable gas-producing capacity, depending upon the positions in which the generator may be placed at the will of the user.

The carbid may be charged loosely into the vessel 14 and the ash readily removed therefrom by taking off the cap 15, or, if preferred, the carbid may be placed in a suitable cartridge, as indicated by the dotted lines 26, such cartridge being of a pervious nature or having a perforable end. If placed within a cartridge, the ash is prevented from clogging up the water-inlet openings. It will be observed that the gas and the carbid are entirely surrounded by water, and the exterior body of the lamp is thereby prevented from overheating.

Many variations in the design, proportion, and particular construction of the parts may be made without departing from the scope of the invention.

I claim—

1. An acetylene-gas generator, comprising in combination, a chamber to contain a body of water, a generating-chamber adapted to contain carbid and arranged within the water-chamber and a vessel having its lower end open and inclosing the generating-chamber and providing therewith an annular water-space surrounding the generating-chamber and having direct and unobstructed communication with the liquid-supply, the generating-chamber being provided in its upper portion with water-inlets at various elevations above the carbid-space, whereby the water is admitted to the upper surface of the carbid only and in quantity regulated by the gas-pressure, substantially as described.

2. In an acetylene-gas generator, the combination with a liquid-chamber, a carbid-chamber and a vessel inclosing the carbid-chamber and providing therewith an annular water-space surrounding the carbid-chamber, the latter being provided with water-inlet openings accessible to water within said annular space, and the generating-chamber and its inclosing vessel being bodily movable and adjustable to various positions, and means for sustaining the said chamber and vessel in their adjusted positions, substantially as described.

3. An acetylene-gas generator and burner embodied in a lamp having a hollow body adapted to contain a liquid, a vessel supported within said body in position to be submerged by its liquid contents, said vessel having its lower end open and unobstructed and its upper end closed to provide a gas-chamber, a pipe extending from the gas-chamber upwardly through the liquid-chamber and provided with a burner and an interior vessel providing a generating-chamber surrounded by the gas-holder and providing therewith an annular space around the generator, open to the liquid-supply, said generating-chamber having a closed lower end and water-inlet openings and gas-escape openings in its upper portion above the carbid-space, said water-inlet openings being arranged at different elevations, substantially as described.

4. In an acetylene-gas generator, the combination with a liquid-chamber and a generating-chamber, having perforations in its side wall at varying distances from its top or upper end, an open-ended vessel inclosing said generating-chamber and forming therewith an annular water-space, and means for adjusting said vessel and said chamber at various elevations within the body of water, substantially as described.

5. In an acetylene-gas generator, the herein-described means of supplying water to the carbid, comprising a carbid-containing vessel, having a bead or channel in its wall provided with perforations at different elevations, and an absorbent material in filament form wound within said channel over said perforations, substantially as described.

THOMAS F. WILLIAMS.

Witnesses:
E. C. BRICE,
W. P. GRIFFITH.